(12) United States Patent
Smith

(10) Patent No.: US 9,659,470 B2
(45) Date of Patent: May 23, 2017

(54) DOOR/WINDOW CONTACT SYSTEM

(71) Applicant: Honeywell International Inc., Morristown, NJ (US)

(72) Inventor: Richard Alan Smith, Sunriver, OR (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 15/145,139

(22) Filed: May 3, 2016

(65) Prior Publication Data

US 2016/0275764 A1    Sep. 22, 2016

Related U.S. Application Data

(63) Continuation of application No. 14/622,040, filed on Feb. 13, 2015, now Pat. No. 9,361,773, which is a
(Continued)

(51) Int. Cl.
*G08B 13/08* (2006.01)
*G08B 23/00* (2006.01)
(Continued)

(52) U.S. Cl.
CPC ......... *G08B 13/08* (2013.01); *G06K 19/0725* (2013.01); *G06K 19/07758* (2013.01);
(Continued)

(58) Field of Classification Search
CPC .......... G08B 13/19608; G08B 13/1961; G08B 13/08; G08B 13/14; G08B 23/00; G06K 2017/0045; G06K 2017/0048; G06K 2017/007; G06K 2017/0074; G06K 2017/0087; G06K 19/0723;
(Continued)

(56) References Cited

U.S. PATENT DOCUMENTS 3,588,858 A * 6/1971 Demuth ................ G08B 21/04
340/502
4,633,231 A * 12/1986 Kilian ................ G06K 19/0723
340/307
(Continued)

FOREIGN PATENT DOCUMENTS

CN      101790815 A     7/2010
EP      2 182 581 A1    5/2010
(Continued)

OTHER PUBLICATIONS

English-language translation of Abstract for CN patent application publication 101790815 A, dated Jul. 28, 2010.
(Continued)

*Primary Examiner* — Van Trieu
(74) *Attorney, Agent, or Firm* — Husch Blackwell LLP

(57) ABSTRACT

A window or door position detector includes an RFID tag attachable to a window or a door and a transceiver. The transceiver emits an activating signal to the tag. The tag, in turn, responds with an identifying RF signal indicative of a predetermined position of the window or the door. The detector includes a transceiver that can communicate with both the tag and a displaced monitoring system control panel.

16 Claims, 3 Drawing Sheets

Related U.S. Application Data continuation of application No. 13/693,903, filed on Dec. 4, 2012, now Pat. No. 8,988,225.

(51) Int. Cl.
*G06K 19/07* (2006.01)
*G06K 19/077* (2006.01)
*G08B 13/196* (2006.01)
*G08B 29/04* (2006.01)
*G08B 25/10* (2006.01)

(52) U.S. Cl.
CPC ... *G08B 13/1961* (2013.01); *G08B 13/19608* (2013.01); *G08B 23/00* (2013.01); *G08B 29/046* (2013.01); *G08B 25/10* (2013.01)

(58) Field of Classification Search
CPC .......... G06K 19/0725; G06K 19/0727; G06K 19/07749; G06K 19/07758; G06K 19/07766
See application file for complete search history.

(56) References Cited

U.S. PATENT DOCUMENTS

| | | | |
|---|---|---|---|
| 5,887,176 A | 3/1999 | Griffith et al. | |
| 6,057,759 A * | 5/2000 | Marsh | G08B 21/0227 340/539.11 |
| 7,800,497 B2 | 9/2010 | Marusak et al. | |
| 7,986,235 B2 | 7/2011 | Posamentier | |
| RE43,178 E | 2/2012 | Ghazarian | |
| 8,482,413 B2 | 7/2013 | Martin | |
| 8,502,674 B1 * | 8/2013 | Cole | G08B 21/0227 340/568.1 |
| 2004/0160309 A1 | 8/2004 | Stilp | |
| 2005/0128104 A1 | 6/2005 | Karabinis | |
| 2008/0143524 A1 | 6/2008 | Marusak et al. | |
| 2009/0303004 A1 | 12/2009 | Tuttle | |
| 2010/0135187 A1 | 6/2010 | Kwark | |
| 2010/0225482 A1 | 9/2010 | Kasai et al. | |
| 2011/0043362 A1 | 2/2011 | Reibel | |
| 2013/0049929 A1 | 2/2013 | Gerlach | |
| 2013/0181838 A1 * | 7/2013 | Luke | G08B 21/24 340/572.1 |

FOREIGN PATENT DOCUMENTS

| | | |
|---|---|---|
| EP | 2 287 812 A1 | 2/2011 |
| JP | 2007-155554 A | 6/2007 |
| JP | 2010-39896 A | 2/2010 |

OTHER PUBLICATIONS

English-language translation of Abstract for JP patent application publication 2007-155554 A, dated Jun. 21, 2007.
English-language translation of Abstract for JP patent application publication 2010-39896 A, dated Feb. 18, 2010.
First Office Action and Search Report for corresponding CN patent application 201310636195.4, dated Apr. 6, 2016.
English-language translation of First Office Action and Search Report for corresponding CN patent application 201310636195.4, dated Apr. 6, 2016.
European Search Report, dated Oct. 23, 2015, corresponding to EP Application No. EP 13 19 1485.

* cited by examiner

DOOR/WINDOW CONTACT SYSTEM

CROSS-REFERENCE TO RELATED APPLICATIONS

This application is a continuation of and claims the benefit of the filing date of U.S. application Ser. No. 14/622,040 filed Feb. 13, 2015, now U.S. Pat. No. 9,361,773, which is a continuation of and claims the benefit of the fling date of U.S. application Ser. No. 13/693,903 filed Dec. 4, 2012, now U.S. Pat. No. 8,988,225.

FIELD

The application pertains to location or position detectors. More particularly, the application pertains to such detectors that can be used to detect a change of position of a window or a door.

BACKGROUND

Known door and window contacts utilized in intrusion detection systems are typically based on reed and magnet technology. This technology, although inexpensive to implement, has limitations. The two major ones are gap limitations and security vulnerability.

"Wide-gap" reed switch contacts have had their maximum functional gaps stretched to reliable limits through various methods. However, mounting on surfaces constructed of ferrous materials results in a magnetic flux field interference that further reduces the maximum operating gap.

Most reed based contacts are also defeated by the use of a magnet introduced in close proximity to the reed by an intruder. There are numerous improved implementations that reduce this security vulnerability, but with additional cost. The challenge is to significantly overcome these issues without increasing the cost of the end product.

DETAILED DESCRIPTION

Figure 1A:
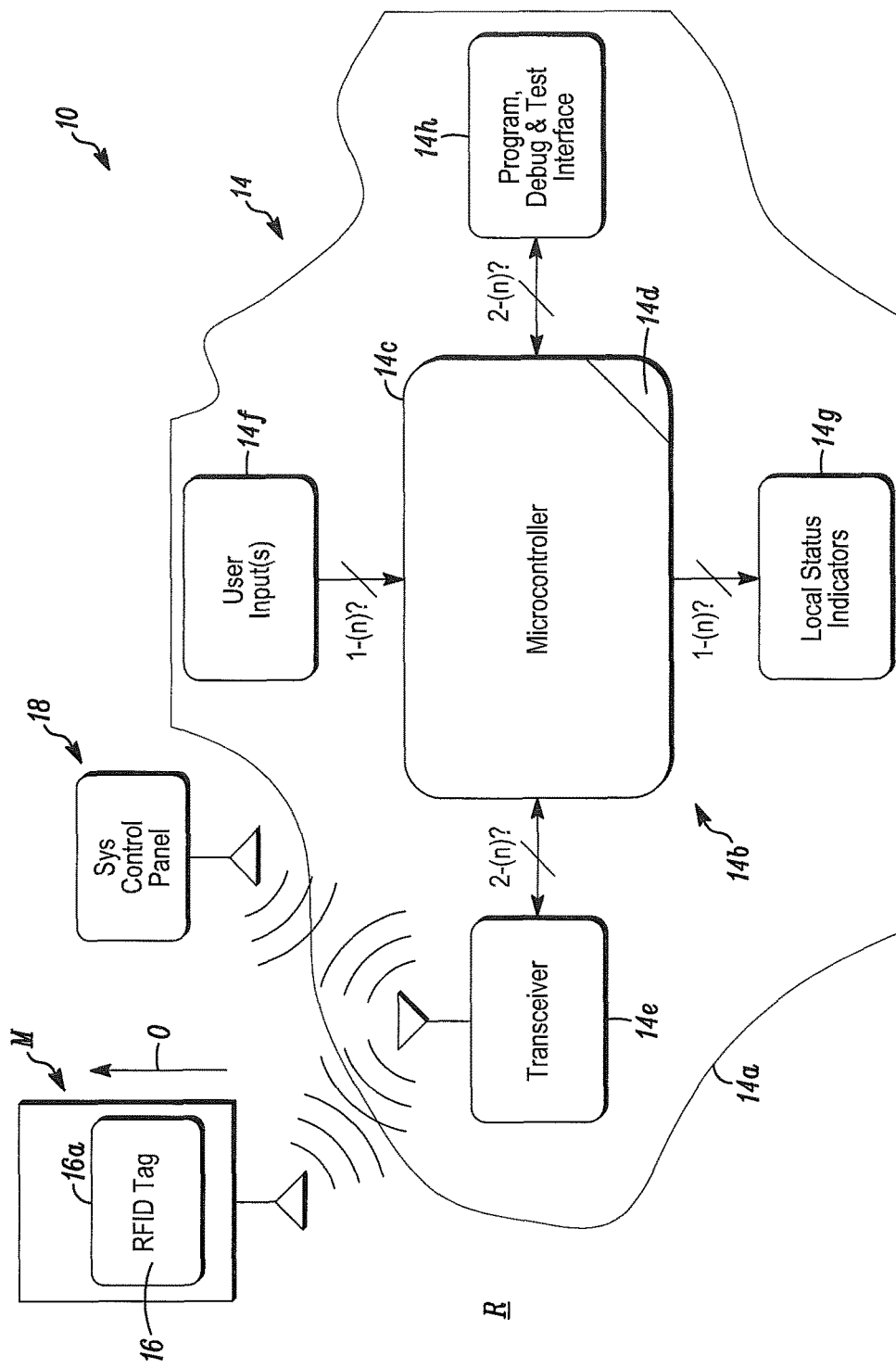
FIG. 1A is a block diagram of a system in accordance herewith.

While disclosed embodiments can take many different forms, specific embodiments hereof are shown in the drawings and will be described herein in detail with the understanding that the present disclosure is to be considered as an exemplification of the principles hereof as well as the best mode of practicing the same and is not intended to limit the claims hereof to the specific embodiment illustrated.

Embodiments hereof address the common issues of gap and security limitations (and robustness) that are typically encountered with reed switch type door and window contacts, particularly wireless versions. A method and system in accordance herewith utilize RFID-type tags. In embodiments hereof, the reed switch and magnet are replaced with, preferably, a passive RFID tag. The "tag" module includes a housing that can be mounted in the same type of locations that the magnet typically would be. The housings can be configured to be used in both surface mount and recessed mount applications. Advantageously, for wireless installations, the detectors will include a transmitter and a receiver or a transceiver to communicate with a control panel. That transceiver would also be used for the interrogation of the RFID tag and for reading its response.

Passive RFID tags can be read by a transceiver at a distance of more than an order of magnitude greater than the greatest spaced apart distance of reed switch and magnet combinations. Since this extent of range is not needed for a security contact, the transmit power for interrogation can be optimized for battery operation. Standard RFID tags can be used by operating the RF transceiver at common frequencies. Alternately, customized RFID tags can be used, without limitation.

In one aspect, embodiments hereof utilize a standard wireless transceiver designed for security system devices. Such transceivers can not only communicate with the alarm system, but can also interrogate and read the response of either a custom or standard passive RFID tag ("tag") to determine if it is present and within a predetermined distance ("gap") using common transceiver circuitry. In yet another aspect, a custom tag and protocol could be used.

A standard off the shelf RFID tag and protocol can be used for optimizing power for battery operation. Some of the known wireless security devices have historically operated with a carrier frequency of 345 MHz (in the U.S.) and, more recently, in the UHF ISM band (~900 MHz). Passive RFID tags have utilized these frequencies. It is, thus, feasible to use the communication carrier frequency to interrogate a tag and read the response utilizing common communications circuitry, thereby adding no additional cost to the sensing system of the detector. Exemplary operable frequencies can be selected from a band extending between 300 Megahertz to 930 Megahertz.

Power required can be optimized to improve battery life by only sending what the tag requires for a "read" to successfully occur. Power could be auto-adjusted so that, during the normal state of the door/window being in the closed position, the power would be minimized.

In yet another aspect, a particular advantage of a custom tag system is that the standard RFID protocols could be avoided by establishing a proprietary protocol, thereby offering additional advantages in power savings and security. An additional method to reduce power is to self-adjust power accordingly. When the gap increases, the receiver eventually will not be able to see the tag's response and at the subsequent interrogation pulse(s), the power would be increased to determine if the tag is still within the user programmed or predefined range ("gap"). This methodology allows the power to be continuously optimized for the current gap so that no more power is used than what is absolutely necessary.

Typical tags can be interrogated and read in under 4 ms. 2 ms with selected protocols is feasible. This time could additionally be reduced through use of a custom tag. The duty cycle and pulse width of integration transmission could be optimized for further power reduction.

Figure 1B:
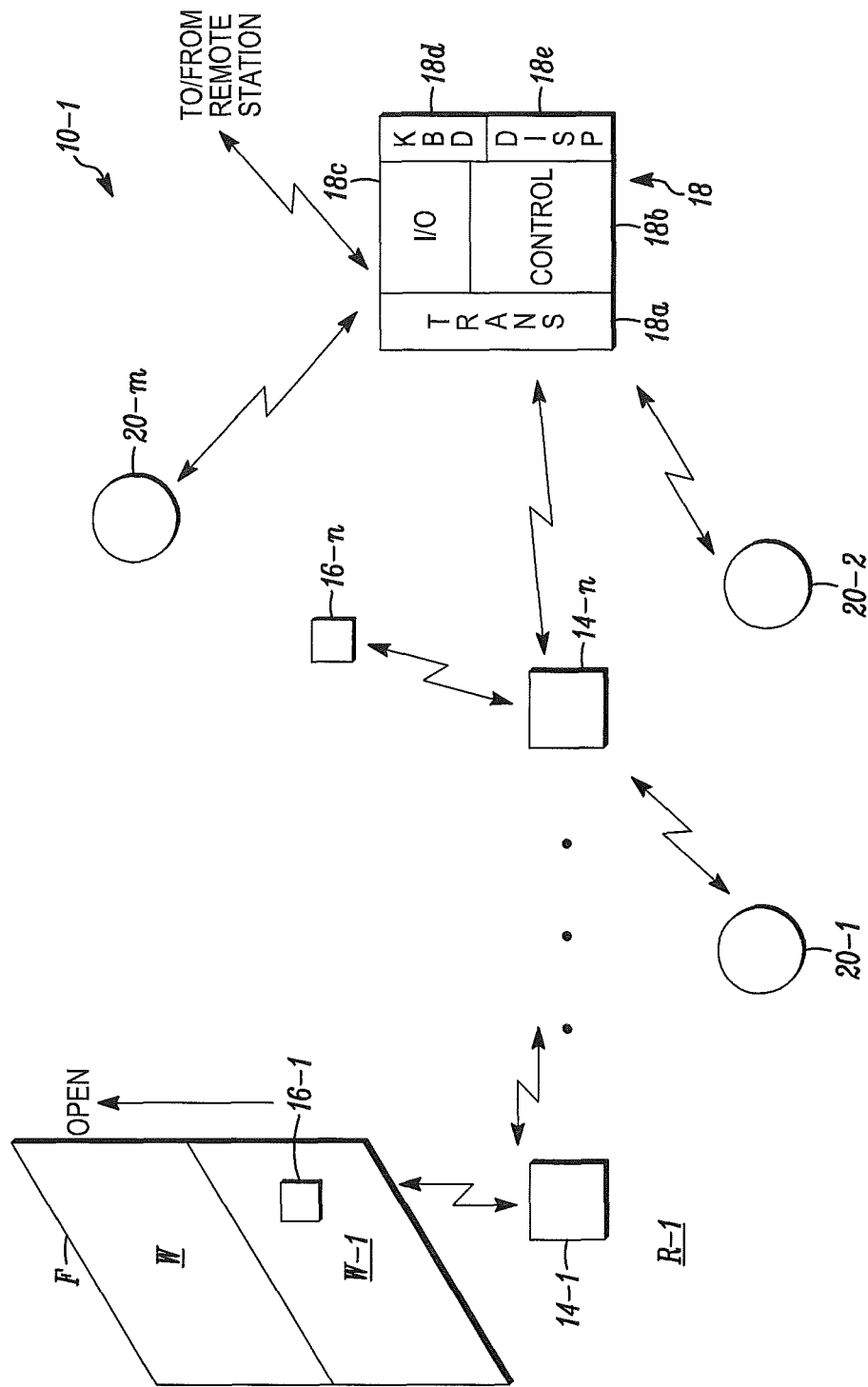
FIG. 1B is a block diagram of the system of FIG. 1A with additional details.

FIGS. 1A and 1B illustrate aspects of systems 10, 10-1 in accordance herewith, which can monitor a region R, R-1 and sense the presence of various alarm conditions. Conditions include intrusion, fire, or gas in the region R, R-1.

FIG. 1A illustrates a position detector 14 that communicates with an RFID tag 16 to sense when a movable member M has moved in a direction O from one position to another. The member M could be, for example, a door or a window in the region R whose position needs to be monitored.

The detector 14 is in wireless, RF communication with the tag 16 as well as a monitoring system control unit or panel 18 as will be discussed subsequently. The detector 14 includes a housing 14a that carries control circuitry generally indicated at 14b, which could be implemented, at least in part, with a programmable processor 14c and associated executable control software 14d.

The detector 14 can also include a transceiver 14e coupled to the control circuits 14b, which can communicate both with the tag 16 and the control panel 18. The transceiver 14e can be used to activate the tag 16, as would be understood by those of skill in the art. The tag 16, when activated, can transmit an identifier to the transceiver 14e at the same or similar frequency as the activating signal from the transceiver 14e.

The return signal from the tag 16 is indicative of the member M being at an acceptable position. If the transceiver 14e fails to receive a return signal from the tag 16, then an alarm condition is indicated. Either the tag has been removed, or it has been displaced from its normal position to a second, different position due to the movement O of the object M. The control circuits 14b can cause the transceiver 14e to transmit an alarm indicting signal to the system control panel 18 at or about the same frequency as the activating signal transmitted to the tag 16. Thus, the transceiver 14e carries out multiple communications functions, thereby reducing over-all cost of the detector 14.

Local user inputs can be provided by an interface 14f. Local visual or audible status indicators 14g can also be carried by the housing 14a and coupled to the control circuits 14b. A test, programming, and diagnostic interface 14h coupled to the control circuits 14b can also be carried by the housing 14a.

The tag 16 can be carried by a housing 16a. The housing 16a can be attached to the movable object M being monitored by adhesive or fasteners with a surface mount or a recessed mounting feature.

FIG. 1B illustrates a system 10-1 that monitors a region R-1. The system 10-1 includes a plurality of position detectors 14-1 . . . 14-n corresponding in structure and operation to the previously discussed detector 14. Respective RFID tags 16-1 . . . 16-n are mounted on objects, such as window W with a movable portion W-1 that is being monitored. The respective detector/tag pairs 14i/16-i interact as discussed above with respect to the detector/tag pair 14/16.

Detectors 14-i communicate wirelessly with the monitoring control unit 18 and a transceiver 18a. The control unit 18 also includes control circuitry 18b, input/output circuitry 18c, an input device, such as a keyboard 18d, and an output device or display 18e. The system 10-1 can also include a plurality of ambient condition detectors, such as 20-i, all of which can be in wireless communication with the control panel 18. The detectors 20-i can include glass break detectors, motion detectors, fire detectors, gas detectors, and the like, all without limitation. In the system 10-1, each of the detectors 14-i includes a common transceiver, such as 14e, which communicates both with the respective tag, such as 16-i, and the control panel 18 via the transceiver 18a.

Figure 2:
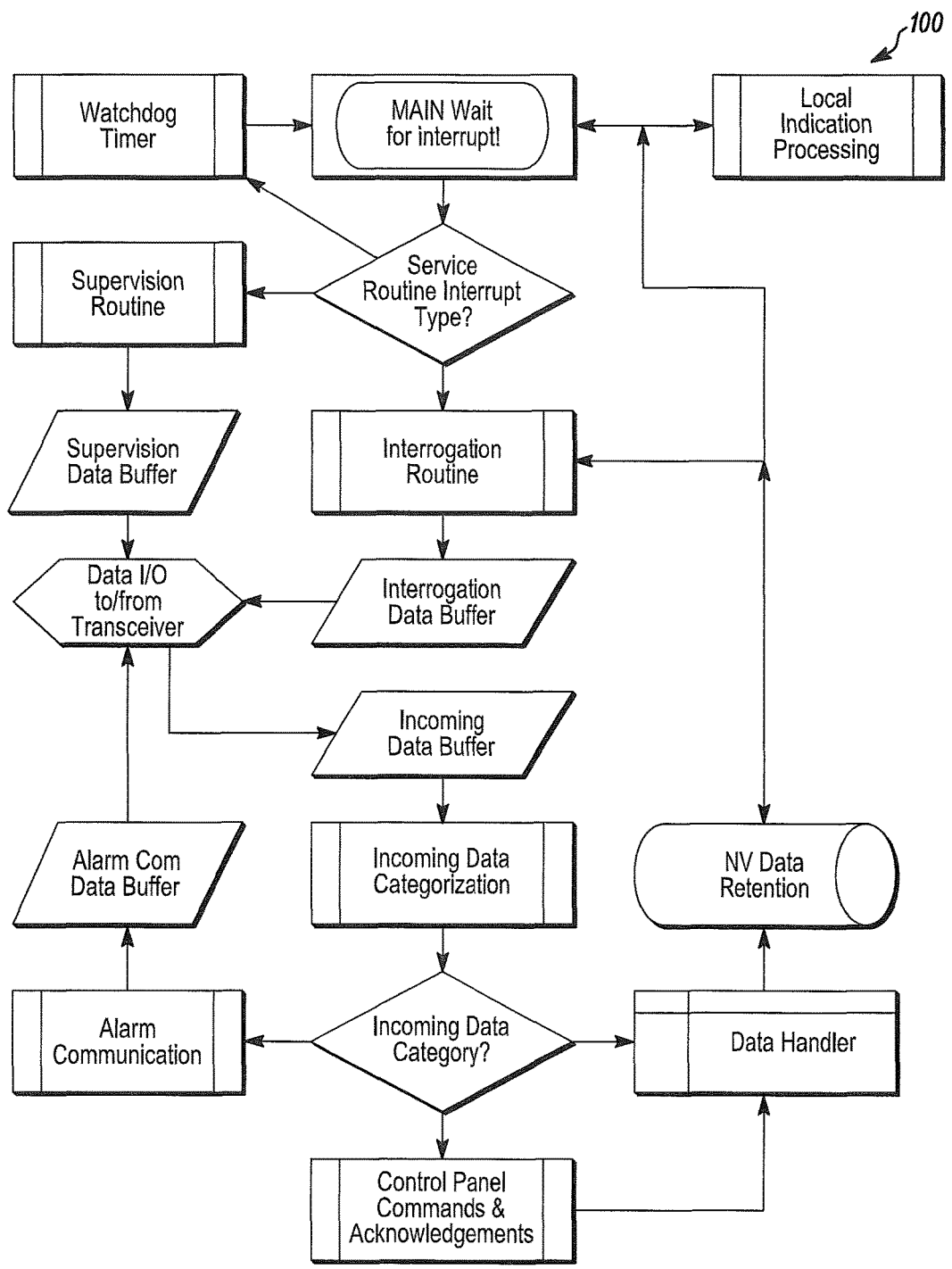
FIG. 2 is a flow diagram of a method in accordance herewith.

FIG. 2 illustrates an exemplary flow diagram of a process 100 of operating one of the position detectors, such as 14-i.

In summary, bi-directional wireless security system position detectors each include a transceiver that would not only be able to interrogate and read an RFID tag on a movable member, but would also communicate or report to a system control unit or panel. With the circuitry being shared, the cost of implementation would be low. In a wireless security contact, which is bi-directional in its communication to the host panel, the reed and magnet cost would be replaced by the cost of the passive tag to implement a position detector as described above. Investigation has shown that passive tags can cost under $1, which makes it feasible to implement the invention from a cost standpoint as both the reed and magnet are replaced. Passive UHF ISM band tags are amongst the lowest in cost with prices below $0.20. With this cost below the cost of the reed and magnet of traditional systems, there should be no additional cost.

As noted above, typical reed switch based contacts can be effectively defeated by a semi-skilled intruder though use of a magnet. Although there are some higher security versions that address this issue, they are also more expensive.

The above disclosed detector has a higher threshold of defeat as it would require a sophisticated active device. Since RFID tags inherently have a unique identification number, they require a RFID reader to be able to read the tag ID. Tags can and often do implement security features so that they will only communicate their unique ID to a reader that is recognized to be valid (read password). A passive attempt at defeat with another tag could be attempted, but is easily dealt with at the reader. With various options for security features, an RFID tag used as a security contact as described above has very significant security advantages.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A method comprising:
    a transceiver transmitting an enabling radio frequency signal to a displaced object;
    responsive to transmitting the enabling radio frequency signal, the transceiver receiving an identifying radio frequency signal from the displaced object when the displaced object is in a first position; and
    absent receiving the identifying radio frequency signal from the displaced object within a predetermined period of time after transmitting the enabling radio frequency signal to the displaced object, the transceiver transmitting a reporting radio frequency signal to a control panel device.

2. The method of claim 1 wherein the displaced object includes an RFID tag.

3. The method of claim 1 wherein the first position includes any position within a predetermined distance of the transceiver.

4. The method of claim 1 further comprising the enabling radio frequency signal including power to activate the displaced object.

5. The method of claim 4 further comprising adjusting a level of the power in the enabling radio frequency to activate the displaced object.

6. The method of claim 1 further comprising:
    the transceiver transmitting the enabling radio frequency signal in a first frequency band; and
    the transceiver receiving the identifying radio frequency signal in the first frequency band.

7. The method of claim 1 further comprising, absent the displaced object being in the first position, the transceiver transmitting the reporting radio frequency signal to the control panel device.

8. The method of claim 1 further comprising:
the transceiver transmitting the enabling radio frequency signal in a first frequency band; and
the transceiver transmitting the reporting radio frequency signal in the first frequency band.

9. A position detector comprising:
a transceiver;
a programmable processor; and
executable control software stored on a non-transitory computer readable medium,
wherein the programmable processor and the executable control software cause the transceiver to transmit an enabling radio frequency signal to a displaced object,
wherein, responsive to transmitting the enabling radio frequency signal, the transceiver receives an identifying radio frequency signal from the displaced object when the displaced object is in a first position, and
wherein, absent receiving the identifying radio frequency signal from the displaced object within a predetermined period of time after transmitting the enabling radio frequency signal to the displaced object, the programmable processor and the executable control software cause the transceiver to transmit a reporting radio frequency signal to a control panel device.

10. The position detector of claim 9 wherein the displaced object includes an RFID tag.

11. The position detector of claim 9 wherein the first position includes any position within a predetermined distance of the transceiver.

12. The position detector of claim 9 wherein the enabling radio frequency signal includes power to activate the displaced object.

13. The position detector of claim 12 wherein the programmable processor and the executable control software adjust a level of the power in the enabling radio frequency to activate the displaced object.

14. The position detector of claim 9 wherein the programmable processor and the executable control software cause the transceiver to transmit the enabling radio frequency signal in a first frequency band, and wherein the programmable processor and the executable control software cause the transceiver to receive the identifying radio frequency signal in the first frequency band.

15. The position detector of claim 9 wherein, absent the displaced object being in the first position, the programmable processor and the executable control software cause the transceiver to transmit the reporting radio frequency signal to the control panel device.

16. The position detector of claim 9 wherein the programmable processor and the executable control software cause the transceiver to transmit the enabling radio frequency signal in a first frequency band, and wherein the programmable processor and the executable control software cause the transceiver to transmit the reporting radio frequency signal in the first frequency band.

* * * * *